US009920271B2

(12) United States Patent
Bumgarner

(10) Patent No.: US 9,920,271 B2
(45) Date of Patent: Mar. 20, 2018

(54) METHOD FOR THE PRODUCTION OF A LOW EMISSION BIOMASS FUEL COMPOSITION FROM WASTE MATERIALS

(71) Applicant: V35A Enterprises, LLC, Fairfax, IA (US)

(72) Inventor: Timothy Bumgarner, Fairfax, IA (US)

(73) Assignee: V35A Enterprises, LLC, Fairfax, IA (US)

( * ) Notice: Subject to any disclaimer, the term of this patent is extended or adjusted under 35 U.S.C. 154(b) by 0 days.

(21) Appl. No.: 14/217,153

(22) Filed: Mar. 17, 2014

(65) Prior Publication Data

US 2014/0259894 A1 Sep. 18, 2014

Related U.S. Application Data

(60) Provisional application No. 61/801,618, filed on Mar. 15, 2013, provisional application No. 61/801,693, filed on Mar. 15, 2013.

(51) Int. Cl.
*C10L 5/36* (2006.01)
*C10L 5/46* (2006.01)

(52) U.S. Cl.
CPC .............. *C10L 5/361* (2013.01); *C10L 5/363* (2013.01); *C10L 5/46* (2013.01); *Y02E 50/10* (2013.01); *Y02E 50/30* (2013.01)

(58) Field of Classification Search
CPC .................................. C10L 5/361; C10L 5/363
USPC .................................................... 44/589, 590
See application file for complete search history.

(56) References Cited

U.S. PATENT DOCUMENTS

| 5,888,256 | A | * | 3/1999 | Morrison | 44/552 |
| 6,444,437 | B1 | | 9/2002 | Sporleder et al. | |
| 6,506,223 | B2 | | 1/2003 | White | |
| 7,771,699 | B2 | * | 8/2010 | Adams et al. | 423/484 |
| 7,785,379 | B2 | * | 8/2010 | Drisdelle et al. | 44/535 |
| 8,117,974 | B2 | | 2/2012 | Ganga et al. | |
| 8,123,824 | B2 | * | 2/2012 | Cavero et al. | 44/535 |
| 8,382,862 | B2 | * | 2/2013 | Bohlig et al. | 44/589 |
| 8,617,264 | B2 | * | 12/2013 | Bohlig et al. | 44/589 |

(Continued)

FOREIGN PATENT DOCUMENTS

WO 2006031757 A1 3/2006

*Primary Examiner* — Ellen McAvoy
(74) *Attorney, Agent, or Firm* — Gehrke & Associates, SC; Lisa M. Gehrke

(57) ABSTRACT

The present disclosure provides a novel method for the production of a biomass composition from waste materials including the steps of evaluating the waste material for emissions related factors, treating the evaluated waste material with the additive composition to form a low emissions biomass composition and shaping the biomass composition into solid fuel formations. The present invention further provides an additive composition used in the treatment of the waste materials that comprises an emission sponge, a filler and optional BTU modifier. The treating step includes the steps of sizing selected waste materials, blending the sized waste materials with the additive composition formulated specifically for the waste material and forming the blended waste materials into solid fuel formations. The resulting biomass solid fuel formations produce lower emissions than typically produced by coal and may be combined with, or used in place of coal in coal burning structures and devices.

16 Claims, 2 Drawing Sheets

(56) References Cited

U.S. PATENT DOCUMENTS

| | | |
|---|---|---|
| 8,673,031 B2* | 3/2014 | Dale et al. .................. 44/589 |
| 8,702,820 B2* | 4/2014 | Blackmon et al. ............. 44/589 |
| 2007/0006526 A1* | 1/2007 | Cullen ........................ 44/589 |
| 2007/0161095 A1 | 7/2007 | Gurin |
| 2008/0171297 A1* | 7/2008 | Reynolds et al. ................ 432/1 |
| 2008/0280236 A1* | 11/2008 | Wright ............................ 431/2 |
| 2009/0235578 A1* | 9/2009 | Nopper ........................ 44/590 |
| 2009/0249685 A1 | 10/2009 | Flowers et al. |
| 2010/0162619 A1 | 7/2010 | Peus |
| 2010/0300368 A1* | 12/2010 | Myers et al. ................ 119/171 |
| 2011/0056126 A1 | 3/2011 | Harvey et al. |
| 2011/0081336 A1 | 4/2011 | Medoff |
| 2012/0196240 A1 | 8/2012 | Borodyanski et al. |
| 2012/0285080 A1 | 11/2012 | Despen et al. |
| 2013/0247456 A1* | 9/2013 | Dale et al. .................. 44/535 |
| 2014/0157659 A1* | 6/2014 | Bohlig et al. ................. 44/589 |
| 2014/0173976 A1* | 6/2014 | Myers et al. ................. 44/576 |

* cited by examiner

METHOD FOR THE PRODUCTION OF A LOW EMISSION BIOMASS FUEL COMPOSITION FROM WASTE MATERIALS

CROSS REFERENCE TO RELATED APPLICATION

This application is a conversion of provisional applications U.S. 61/801,618 and U.S. 61/801,693, both filed on Mar. 15, 2013. These applications are herein incorporated by reference.

SUMMARY OF THE INVENTION

The present disclosure is related to methods of converting waste materials into burnable fuel. More specifically, the present disclosure is directed to a method of making a low emission biomass fuel composition from treated waste material.

The present disclosure is directed to a novel method for the production of a biomass composition from waste materials, such as land fill waste, industrial waste, construction waste, municipal garbage, biowaste including switch grass, forest litter, paper waste, peat, cane waste, and other compostable garbage. The method includes the steps of evaluating the waste material for emissions related factors, treating the evaluated waste material to form a low emissions biomass composition and shaping the biomass composition into solid fuel structures.

The treating step further comprises the steps of sizing selected waste materials, blending the sized waste materials with an additive formulated specifically for the waste material and forming the blended waste materials into biomass fuel formations. The resulting biomass formations produce lower emissions than typically produced by coal and may be used as a replacement for coal, or as an additive to be combined with coal, in coal burning structures and devices.

Other features and advantages of the present invention will become apparent after study of the specification and claims that follow. All publications and patents mentioned in this application are herein incorporated by reference for any purpose.

BRIEF DESCRIPTION OF THE DRAWINGS

The following disclosure can be better understood with reference to the following detailed description together with the appended illustrative drawing in which like elements are numbered the same.

DEFINITIONS

As used herein, "waste material" and "waste materials" are defined as any waste materials, such as land fill waste, industrial waste, construction waste, municipal garbage, biowaste including switch grass, forest litter, paper waste, peat, cane waste, and other compostable garbage.

As used herein, "emission" or "emissions" are defined environmentally undesirable gas byproducts of combustion, including greenhouse gases, carbon gases, and actually and potentially toxic or environmentally detrimental gases.

As used herein, "emission sponge" is defined as a material that absorbs spent fuel and re-burns the spent fuel resulting in reduced carbon emissions and reduced actual and potential toxic or environmentally negative emissions from the fuel. Emission sponges include salt, sea salt, baking powder, calcium from sea shells, rice, rice by-product, their equivalents, and combinations thereof.

As used herein, "filler" is defined as a material that acts as a mechanical bond within the waste material to fill voids left by break down of the waste material. Fillers include natural products that would provide a mechanical bond between the waste material particles. These materials include flour, such as, soy flour, wheat flour, and rice flour, rice, oats, potatoes, their equivalents and combinations thereof.

As used herein, "BTU modifier" is defined as a material that can hold or transfer heat. BTU modifiers include, steel slag, coal fines, iron powder, their equivalents, and, combinations thereof.

DETAILED DESCRIPTION OF THE INVENTION

Figure 1A:
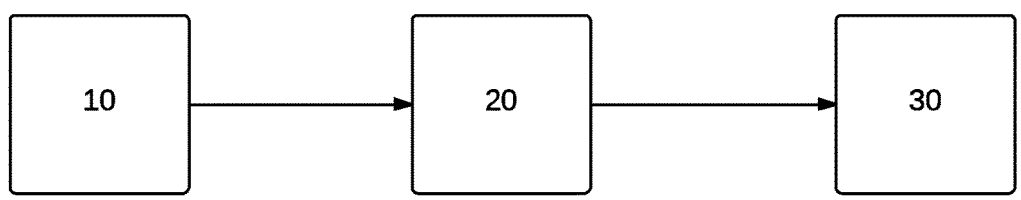
FIG. 1A is a flow chart illustrating the steps involved in the process of making a low emission biomass composition.

The present disclosure provides a novel method for the production of a biomass fuel composition from waste materials. Referring to FIG. 1A, the method for the production of a biomass fuel composition from waste materials includes the steps of evaluating (10) selected waste material for emissions related factors, treating (20) the evaluated waste material to adjust the emission levels of the biomass composition, and forming (30) the biomass composition into solid fuel formations. The solid fuel formations resulting from this method produce lower gas emission than coal alone. The solid fuel formations may be used in place of, or combined with coal, in coal burning structures and devices.

In the evaluation step (10) information regarding certain properties of a selected starting waste material is gathered. These properties include the moisture/water content of the waste material, the gas emission levels released by the untreated waste material when it is burned, and the BTU levels produced by the untreated waste material when it is burned. The emission levels and BTU levels are then compared to the predetermined target levels for each property and used to formulate an additive used to produce a biomass fuel composition that displays target properties.

The moisture/water content of the untreated waste material will vary greatly but is preferably between 12.0% and 25.0% by weight and most preferably between 18.0% and 23.0% by weight. If the water content of the waste material needs to be increased, water will be added to the waste material during the treatment stage. If the water content is determined to be too high, additional waste material may be added to reduce the percentage of water in the waste material. Alternatively, the waste material may be dried until the water content is within the acceptable range.

The gas emission level of the untreated waste material is adjusted to its target level through the addition of an additive during the treatment step. The additive comprising an emission sponge, a filler and an optional BTU modifier. The formulation of a specific additive is determined by modifying batches of the untreated waste material with emission sponge, filler and optionally, BTU modifier until the target levels are achieved. For example, if the waste material is municipal garbage and it produces emissions higher than desired, the specific amount of emission sponge needed to lower the gas emission to the target level is calculated and included in the additive composition formulated for the municipal garbage. Likewise, if a BTU rating of a municipal garage sample is less than a desired amount, a BTU modifier is included in the additive to adjust the BTU rating of the municipal waste. The amount of BTU modifier needed to increase the BTU rating of the garbage is calculated and included in the additive composition formulated for the municipal garbage.

Although the particular formulation of the factors in the additive composition will vary depending upon specific target requirements, the amount of emission sponge is preferably between 0.1% to 10.0% by weight, and most preferably between 1.5% to 3.0% by weight, and, the amount of filler is preferably between 0.1% to 6.0% by weight, and most preferably between 1.0% to 3.0% by weight. If the biomass fuel composition will be used as an additive to be combined with coal, a BTU modifier will not be needed in the additive because the coal will serve as a BTU modifier. In this circumstance, the amount of emission sponge included in the additive composition, the may be overloaded to provide emission reduction for the waste material and the coal with which it will be blended. If the biomass fuel composition is not being used as an additive, the amount of BTU modifier present in the additive is preferably between 0.1% to 50.00% by weight, and most preferably between 3.0% to 5.0% by weight.

Figure 1B:
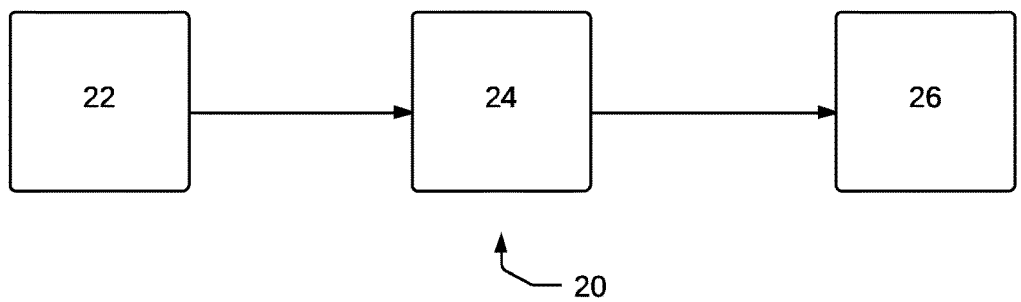
FIG. 1B is a flow chart illustrating the steps for the treatment of waste materials within the process of making low emission biomass composition.

Referring to FIG. 1B, the treating step (20) further comprises sizing (22) selected waste materials and soaking and blending (24) the sized waste materials with the additive composition formulated specifically for the waste material. An additional second sizing (26) step may be necessary depending on the particle size of the biomass composition.

Figure 2:
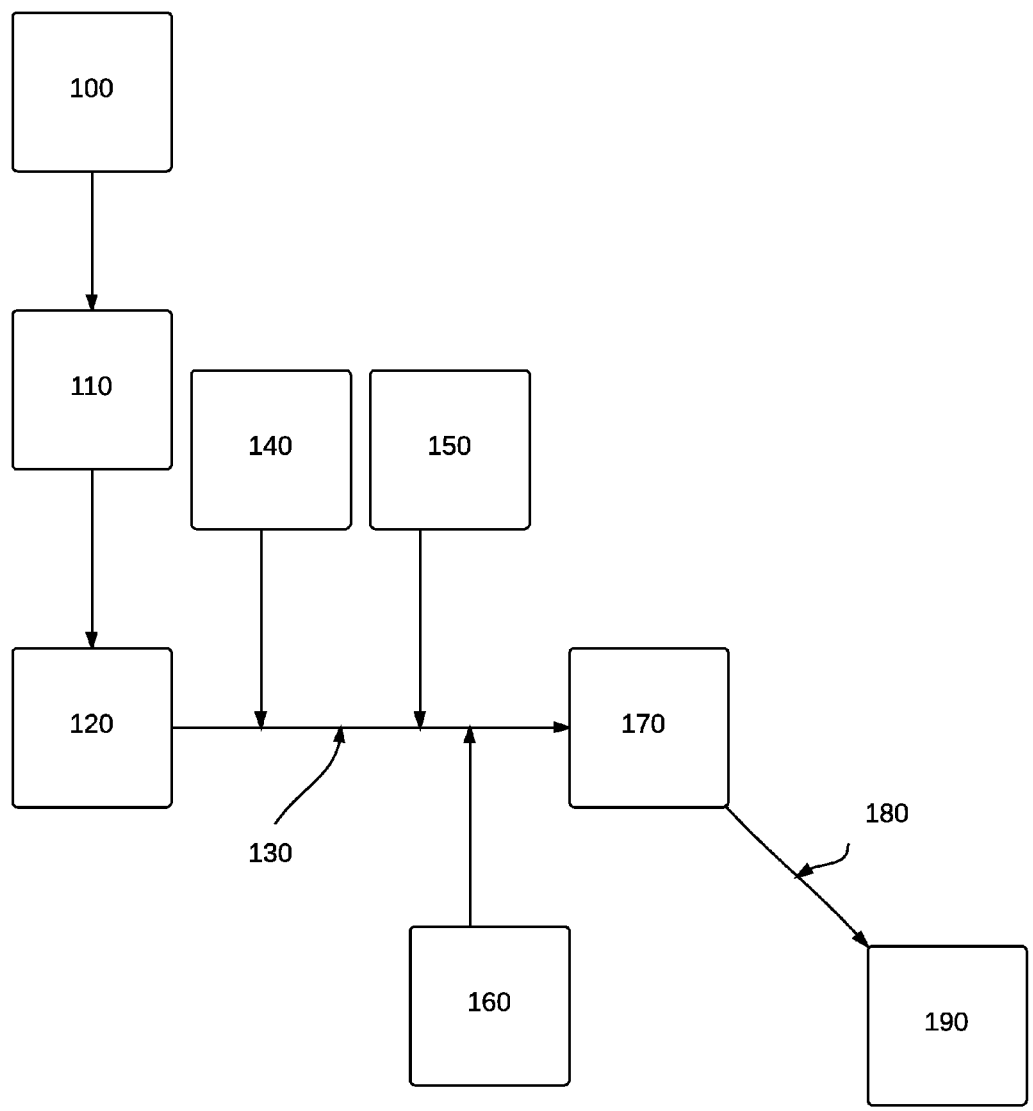
FIG. 2 is a flow chart illustrating the steps involved in the process of making low emission solid fuel formations in more detail.

Referring to FIG. 2, after the evaluation step, the waste material must be sized (120) to ensure the diameter of the waste material particles are uniform and not greater than one half inch. If the waste material particles have been pre-sized to fall within these parameters, a first size reduction is not needed. If, however, the waste material is irregular in shape and includes particles greater than one half inch in diameter, the particles are introduced to a hopper (100) and they are fed through a shredder (110) or similar size reduction device (120), to form uniform waste material particles not greater than one half inch in diameter and preferably between one half inch and one quarter inch in diameter.

The sized waste material is the treated with the additive formulated for use with that waste material and allowed to soak at a temperature of at least 130 degrees Fahrenheit, but preferably at least 135 degrees Fahrenheit, for at least one minute.

The treated waste composition is then fed (130) into a hammer mill (170) for further size reduction until the size of the waste material particles is not greater than one quarter inch.

The treated biomass composition is then fed (180) into a press (190) and formed into pellets, briquettes, spheres or other desired shapes. Adjustments in the pressure used in the formation of the solid fuel formations may be used to further adjust the BTU ratings. The resulting solid fuel formations may then be added directly to the coal burning device or structure or blended with coal before use.

Although the additive composition may be blended with the waste material at any point in the process prior to the shaping step (190), it is preferably blended into the waste material particulates following the first sizing step (120). The resulting biomass composition comprises between 3.2% to 56.00% by weight additive composition by weight and burns cleaner and more fully than conventional coal or blended biofuels as shown below.

Bioburn Results

| Id1 | Total Moisture | Dry Ash | As-Rec Ash | Dry BTU | As-Rec BTU | Dry Ash Free BTU | Dry Sulfur | As-Rec Sulfur | Sodium in Ash | Lbs SO2/M MBTU |
|---|---|---|---|---|---|---|---|---|---|---|
| Coal Pak | 8.13 | 12.65 | 11.62 | 14142 | 10236 | 12756 | 0.69 | 0.63 | 1.30 | 1.24 |
| Coal-Pak-dup | 8.10 | 13.17 | 12.10 | 14122 | 10221 | 12808 | 0.63 | 0.58 | 1.24 | 1.14 |
| Coal/Corn Stover (2) Pak | 7.10 | 15.14 | 14.07 | 8748 | 8128 | 10310 | 0.83 | 0.77 | 2.09 | 1.89 |
| Coal/Corn Stover (2) Pak-dup | 7.06 | 15.12 | 14.05 | 8758 | 8140 | 10318 | 0.84 | 0.78 | 2.03 | 1.93 |
| Coal/Bio Blend 3 Pak | 8.66 | 19.75 | 18.04 | 8719 | 7964 | 10865 | 0.95 | 0.87 | 1.53 | 2.19 |
| Coal/Bio Blend 3 Pak-dup | 8.61 | 20.07 | 18.34 | 8672 | 7925 | 10850 | 0.96 | 0.88 | 1.50 | 2.21 |
| Corn Stover Pak | 6.04 | 8.27 | 7.77 | 7573 | 7115 | 8256 | 0.07 | 0.06 | 0.76 | 0.18 |
| Corn Stover Pak-dup | 6.02 | 7.92 | 7.44 | 7524 | 7071 | 8171 | 0.05 | 0.05 | 0.80 | 0.14 |

EXAMPLES

Waste material is selected and evaluated for moisture level, BTU levels and emissions levels. An additive composition comprising sea salt and soy flour is formulated based upon the desired BTU and emissions levels.

Still referring to FIG. 2, the waste material is then deposited into a hopper (100), which feeds the waste material (110) into a shredder, and waste materials pass through a shredder (120) to produce waste material particles having a diameter not greater than one half inch. As an auger or conveyor (130) moves the sized waste material, the additive composition comprising sea salt and soy flour is then added (140) to the waste material particles until they are coated with the additive composition.

The coated waste material particles are then transferred into a vat or other receiving container for further treatment and the moisture content and temperature of the mixture is determined. If the moisture content of the coated particulate matter is less than 12.0% by weight, water is added (150) until the moisture content of the waste material particles is preferably between 18.0 to 23% by weight. The waste material and additive composition are then allowed to soak (160) at temperature and for a time sufficient to destroy most biological agents, typically at a temperature of at least 130 degrees Fahrenheit, but preferably at least 135 degrees Fahrenheit, for at least one minute. This step serves to decontaminate the waste material and break down chemical and mechanical bonds within the waste material. If the temperature of the mixture is less than 130 degrees F., the temperature of the mixture is increased with an external heating device until the mixture reaches a temperature of at least 130 degrees Fahrenheit and allowed to soak for at least one minute. This step kills biological contaminants and accelerates breakdown of the mechanical bonds within the waste materials.

In an alternative embodiment, the waste material particles are coated with a corresponding additive composition formulation following the first size reduction then transferred into a vat or similar container. The water content and temperature of the waste material particles is measured and adjusted so that the water content is at least 12% by weight and the temperature is at least 130 degrees Fahrenheit, but preferably at least 135 degrees Fahrenheit.

If needed, the size of the waste material particles is then reduced a second time by passing the soaked particulates through a hammer mill (170) or similar size reduction device until the diameter of the waste material particulates is not greater than one half inch, but preferably not greater than one quarter inch. The milled waste material particulate and additive composition mixture is then move (180) and pressed (190) into desired solid fuel formations such as pellets, briquettes, and spheres. The resulting fuel formations may then be coated with starch for product stabilization.

The scope of the invention is not limited to the specific embodiments described herein. Rather, the claim should be looked to in order to judge the full scope of the invention.

What is claimed is:

1. A method of producing a low emission biomass fuel composition from waste material comprising the steps of:
    a. evaluating selected waste material and formulating an additive for use with the waste material that adjusts the emissions levels produced by the waste material to within a predetermined range;
    b. treating the evaluated waste material with the steps comprising;
        i. measuring and adjusting the moisture content of the selected waste material to a predetermined amount;
        ii. coating the selected waste material with an additive formulated for use with the selected waste material, wherein the additive includes a predetermined amount of an emission sponge consisting of salt, sea salt, or combinations thereof;
        iii. soaking the waste material at a temperature of at least 130 degrees Fahrenheit for at least one minute; and,
        iv. reducing the size of the coated and soaked waste material to form a treated waste material to not greater than one quarter inch in diameter; and then,
    c. forming solid fuel structures from the treated waste material.

2. The method of claim 1, wherein the additive further comprises a filler.

3. The method of claim 2, wherein the additive further comprises a predetermined amount of BTU modifier consisting of steel slag, iron powder, or, combinations thereof.

4. The method of claim 3, wherein the amount of BTU modifier is between 0.1% to 50.00% by weight, the amount of emission sponge is between 0.1% to 10.0% by weight, and, the amount of filler is between 0.1% to 6.0% by weight.

5. The method of claim 2, wherein the emission sponge is sea salt.

6. The method of claim 1, further comprising the step of shredding the selected waste material to a uniform size of not greater than one half inch in diameter.

7. The method of claim 2, wherein the amount of emission sponge is between 0.1% to 10.0% by weight, and, the amount of filler is between 0.1% to 6.0% by weight.

8. A method of making a low emission biomass fuel composition from waste material, comprising the steps of:
    a. measuring the moisture content of selected waste material;
    b. measuring the gas emissions levels of the selected waste material when the waste material is burned;
    c. formulating an additive to be combined with the selected waste material and adjust the emissions levels to fall within a predetermined range, wherein the additive includes a predetermined amount of an emission sponge consisting of salt, sea salt, or combinations thereof, and a predetermined amount of BTU modifier consisting of steel slag, iron powder, or, combinations thereof;
    d. sizing the selected waste material to a uniform size of not greater than one half inch in diameter;
    e. adjusting the moisture content of the sized waste material to be between 12.0% and 25.0% by weight;
    f. coating the sized waste material with the additive formulated for use with the selected waste material; and
    g. soaking the sized waste material at a temperature of at least 130 degrees Fahrenheit for at least one minute.

9. The method of claim 8, further comprising reducing the size of the coated and soaked waste material to not greater than one quarter inch in diameter.

10. The method of claim 9, further comprising pressing the waste material having a diameter not greater than one quarter inch, into solid fuel formations.

11. The method of claim 10, further comprising coating the solid fuel formations with starch for product stabilization.

12. A low emission biomass fuel composition comprising; treated waste material formed through the steps including
    i. measuring and adjusting the moisture content of a selected waste material to a predetermined amount;
    ii. coating the selected waste material with an additive formulated to adjust the emissions levels of the selected waste material within a predetermined range, wherein the additive includes an emission sponge consisting of salt, sea salt, or combinations thereof;
    iii. soaking the waste material at a temperature of at least 130 degrees Fahrenheit for at least one minute;
    iv. reducing the size of the coated and soaked waste material to a predetermined size; and then,
    v. forming solid fuel structures from the treated waste material.

13. The composition of claim 12, wherein the additive further comprises a filler.

14. The composition of claim 12, wherein the additive further comprises a BTU modifier, and wherein the BTU modifier is steel slag, iron powder, or combinations thereof.

15. The composition of claim 13, wherein the emission sponge is sea salt and the filler is soy flour.

16. The composition of claim 14, wherein the BTU modifier is steel slag.

\* \* \* \* \*